Aug. 28, 1934. M. N. RIDLEY 1,971,658
REENFORCED CONCRETE AND OTHER FLOOR, ROOF, WALL, AND THE LIKE
Filed May 6, 1933 5 Sheets-Sheet 1
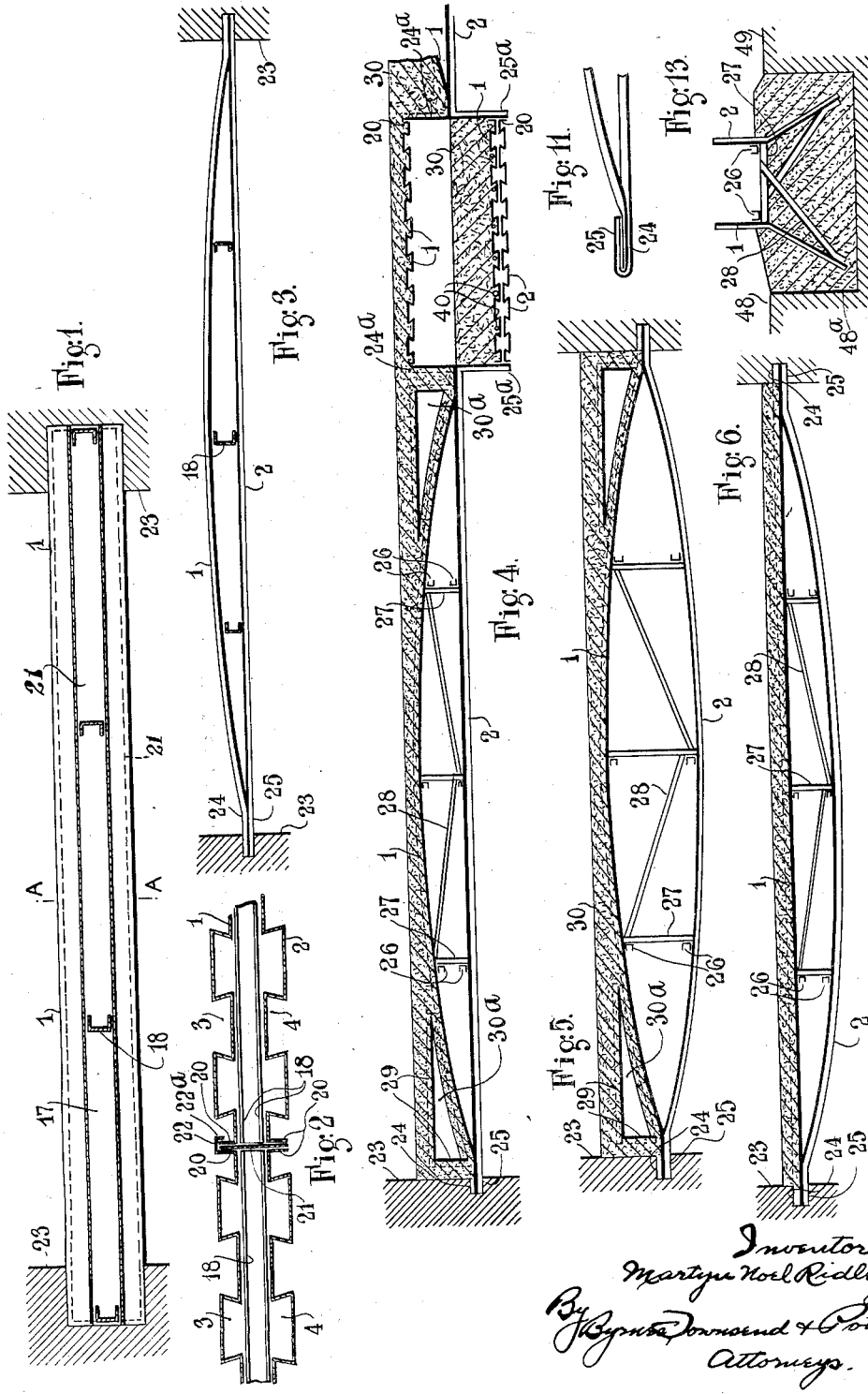

Aug. 28, 1934.　　　　M. N. RIDLEY　　　　1,971,658
REENFORCED CONCRETE AND OTHER FLOOR, ROOF, WALL, AND THE LIKE
Filed May 6, 1933　　　5 Sheets-Sheet 2
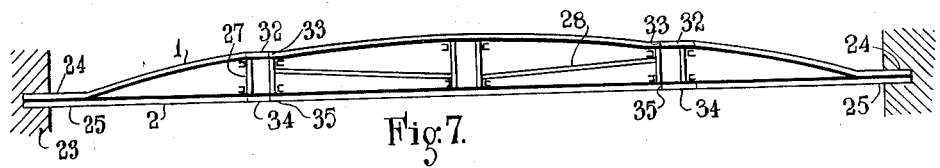
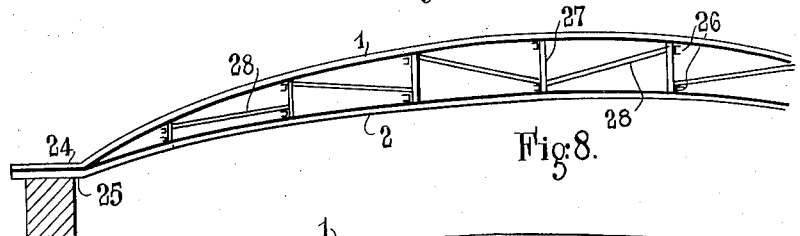
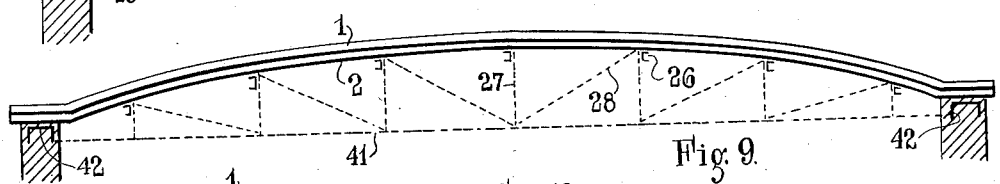
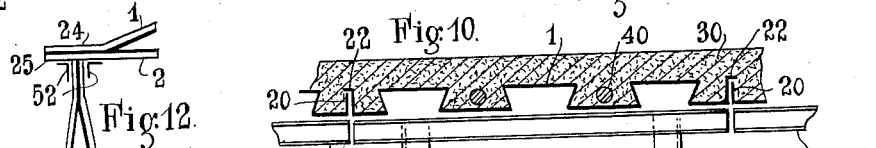
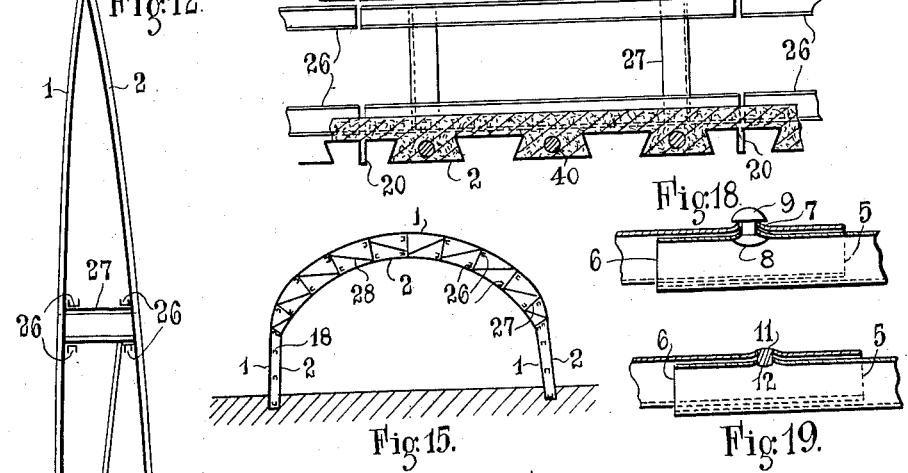
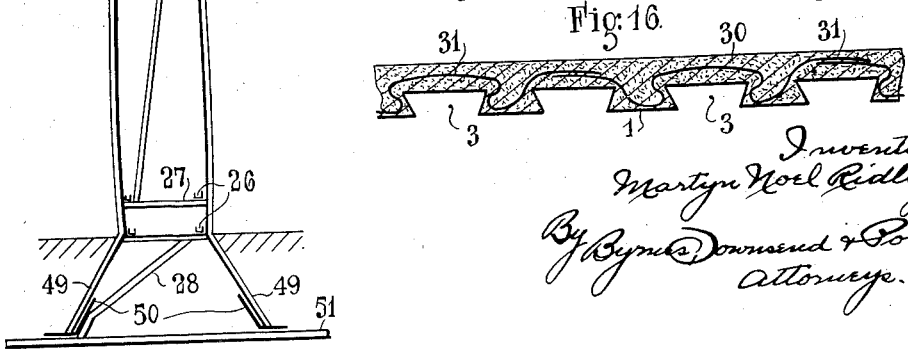

Aug. 28, 1934.    M. N. RIDLEY    1,971,658
REENFORCED CONCRETE AND OTHER FLOOR, ROOF, WALL, AND THE LIKE
Filed May 6, 1933    5 Sheets-Sheet 3
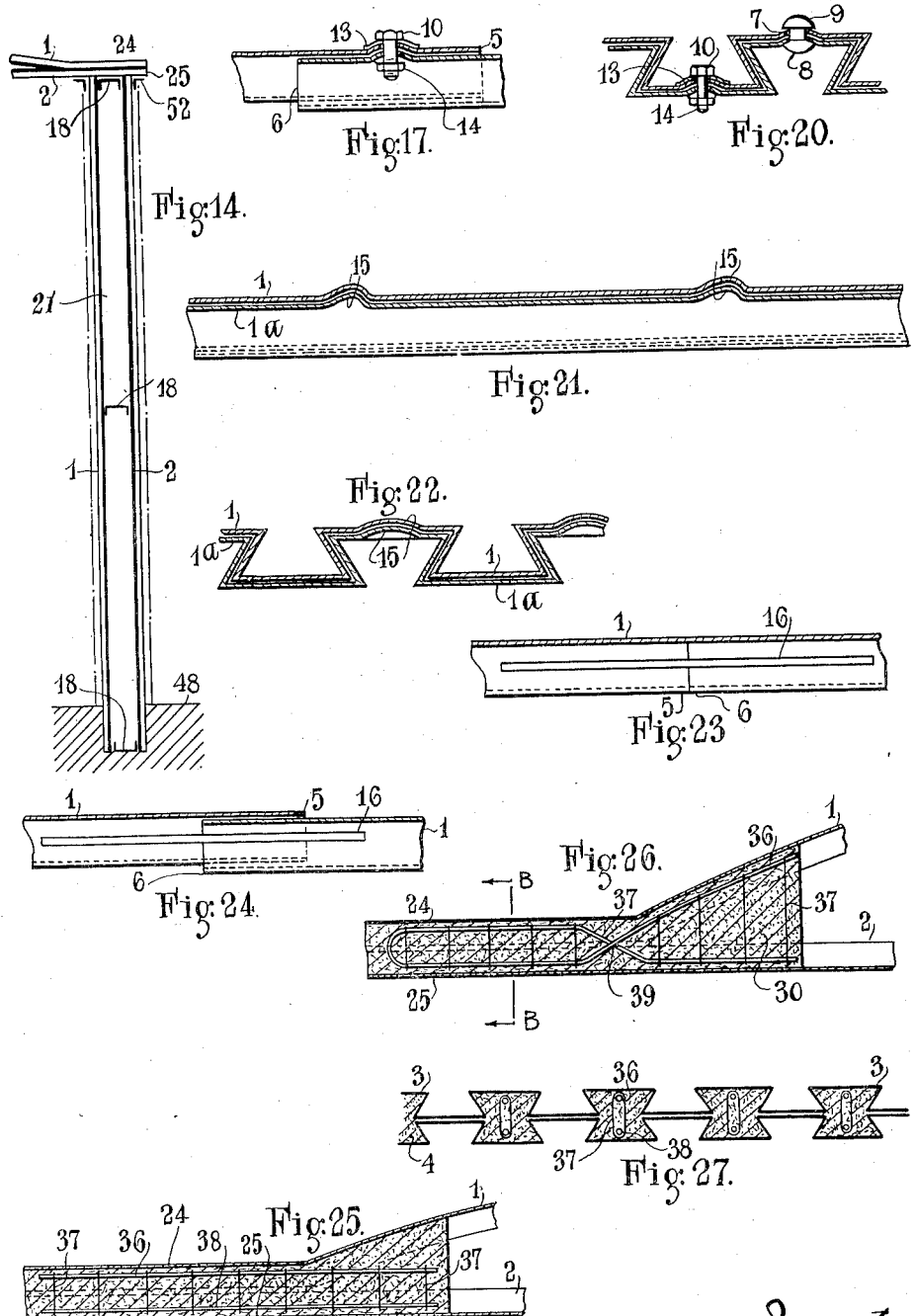

Aug. 28, 1934.   M. N. RIDLEY   1,971,658
REENFORCED CONCRETE AND OTHER FLOOR, ROOF, WALL, AND THE LIKE
Filed May 6, 1933   5 Sheets-Sheet 5

Inventor:
Martyn Noel Ridley,
By Byrnes, Townsend & Potter
Attorneys.

Patented Aug. 28, 1934

1,971,658

UNITED STATES PATENT OFFICE 1,971,658

REENFORCED CONCRETE AND OTHER FLOOR, ROOF, WALL, AND THE LIKE

Martyn Noel Ridley, Leeds, England, assignor of one-half to Max Heymann, London, England Application May 6, 1933, Serial No. 669,767
In Great Britain November 16, 1931

15 Claims. (Cl. 72—70)

This invention relates to improvements in reenforced or armoured or other floors, roofs, or walls, and the like buildings and structures.

The object of this invention is to construct a girder-like metallic structure which forms a permanent centring, if concrete is used, or a permanent structure whether concrete is or is not used, for the above named walls, or floors, or roofs, and the like; at the same time to effect the speedy erection, without shuttering or form work, and without strutting up, or where such strutting up is employed, reducing it to a minimum, whereby a considerable reduction in weight is effected.

According to the invention, there are provided hollow walls, floors and roofs formed of two or more sheets of metal, or meshed or expanded metal, having dovetailed or other corrugations, said sheets being rigidly interconnected and associated with bracing elements separate from said sheets, the whole acting as a permanent girder-like structure, or as a permanent centre.

The invention moreover includes and arrangement of hollow walls, floors and roofs formed of two or more sheets of metal, or meshed or expanded metal, having dovetailed or other corrugations, said sheets being rigidly interconnected in spaced relationship and associated with internal stiffening elements extending transversely to said corrugations, the whole acting as a girder-like permanent structure, or as a permanent centre.

For floors and roofs two lengths of the just named dovetailed or other corrugated sheets of the required width and length, and with the corrugations of the same or varying widths and depths, are employed and placed with their corrugations in the direction of their length one upon the other, or at a suitable distance apart, variable or otherwise, and rigidly connected together as desired, whereby the upper sheet will form the compression member and the lower sheet the tensile member. Both of the said sheets may be straight or curved, or a combination of the two. When the sheet or sheets is or are curved a bowstring or crescent girder is formed. To space the sheets apart short lengths of channel iron or other shaped material may be employed with diaphragms between their ends and the flanges of the sheets which act as shear members. In some cases the channel irons are replaced by stiffening members placed transversely across the sheets and braced apart by vertical and inclined rods. Where the end of a pair of sheets, placed one upon the other, require to be secured together, then the adjacent ends may be bolted, riveted or welded, or one end may be bent over the other, or one or a pair of bars are grouted in position in opposite dovetails. To secure short pieces of sheeting together to form a continuous length, the ends of said sheets are butted or lapped and provided with bars grouted in the corrugations, or the ends when lapped are secured by pressed out depressions, bolts, rivets or welding. When one or both sheets are curved in a structure built up in two or more sections, then parallel portions are provided where the ends of the sections are lapped together. Also where concrete is applied to a curved sheet to the required level for, say, a floor or roof, cavities are formed in the concrete for reducing its weight. Further, in some cases a pair of sheets may be combined by forming the corrugations in the sheets simultaneously.

It will readily be understood that the means herein described for floors and roofs may also be used for walls by placing the corrugated sheets vertically instead of horizontally.

In the drawings hereunto annexed a variety of methods or ways for carrying the invention into practice are illustrated, in which:—

Fig. 1 is a longitudinal section of two corrugated metal sheets with channel distance pieces between them;

Fig. 2 is a cross section of the corrugated metal sheets on line A, A, Fig. 1 showing the channel distance pieces and a diaphragm between them;

Fig. 3 is a longitudinal section of a floor or roof showing a pair of sheets connected together at their ends and also provided with channel distance pieces, the top sheet being shown curved;

Fig. 4 is a similar arrangement to Fig. 3 but with angle, channel and diagonal bars; concrete being also shown on the top of the upper curved sheet;

Fig. 5 is a longitudinal section similar to Fig. 4 but with the bottom and top sheets curved;

Fig. 6 is a longitudinal section similar to Fig. 4 but with the top sheet straight and the lower sheet curved;

Fig. 7 is a longitudinal section similar to Fig. 4 shown without concrete, but the top sheet though curved has lapped joints parallel to the lower sheet;

Fig. 8 is a longitudinal section of another type of roof which is truss braced and both corrugated sheets curved;

Fig. 9 is a longitudinal section of a roof truss or floor formed with two upper curved sheets joined together with tie rod and bracings shown in dotted line;

Fig. 10 is a cross section of Fig. 4 showing round bars laid in the corrugations of top and bottom sheeting and concreted in;

Fig. 11 is a detail of one method of connecting two sheets at their ends;

Fig. 12 is a cross section of a wall in accordance with this invention;

Fig. 13 is a modified arrangement showing the base of the wall embedded in concrete;

Fig. 14 is a wall with straight sheeting on both sides and is similar to the floor shown at Fig. 1;

Fig. 15 is a cross section of an arched roof and walls, the lower wall portions being formed similar to wall Fig. 14 and the upper portion being braced similar to Fig. 8;

Fig. 16 illustrates one of two corrugated sheets covered with concrete in which wire stirrups are embedded;

Figs. 17 and 18 illustrate a pair of sheets lapped together at their ends and cupped for bolts and rivets;

Fig. 19 illustrates a pair of sheets lapped together at their ends and provided with a cupped hole for welding;

Fig. 20 is a cross section showing a rivet and bolt in position;

Fig. 21 is a longitudinal section of two sheets joined together by a pair of depressions;

Fig. 22 is a transverse section of Fig. 21;

Fig. 23 is a sectional elevation showing the ends of a pair of sheets butted together and provided with a bar which may be concreted in for securing the two sheets together;

Fig. 24 is an elevation similar to Fig. 23 but with the two ends of the sheets lapped instead of butted;

Fig. 25 is a sectional elevation showing a modified arrangement for jointing the ends of two sheets together by the insertion of a pair of bars wired together and concreted in position;

Fig. 26 is an elevation of an alternative arrangement of Fig. 25 showing one bar which is bent to form an elongated loop;

Fig. 27 is a section on line B, B, Fig. 26;

Like parts in all the views are marked with similar reference numerals.

Figure 28:
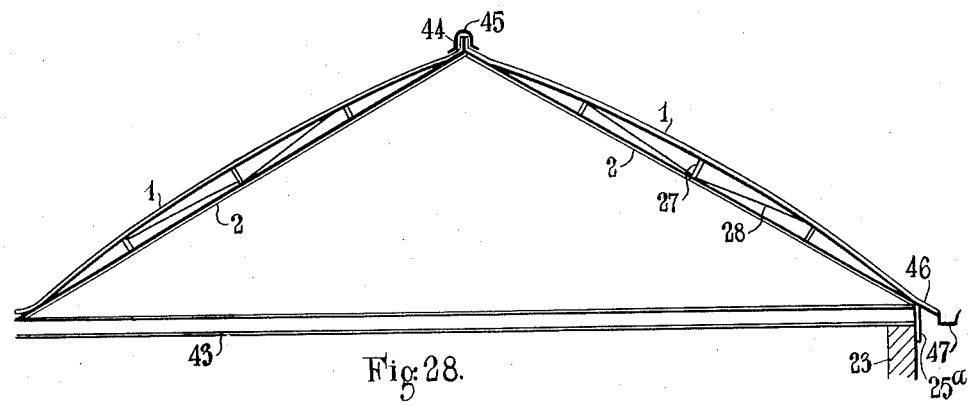
Fig. 28 is an elevation showing a roof composed of two sections in the form of bowstring girders joined together at the crown of the roof and provided with a cover for the joint.
Figure 29:
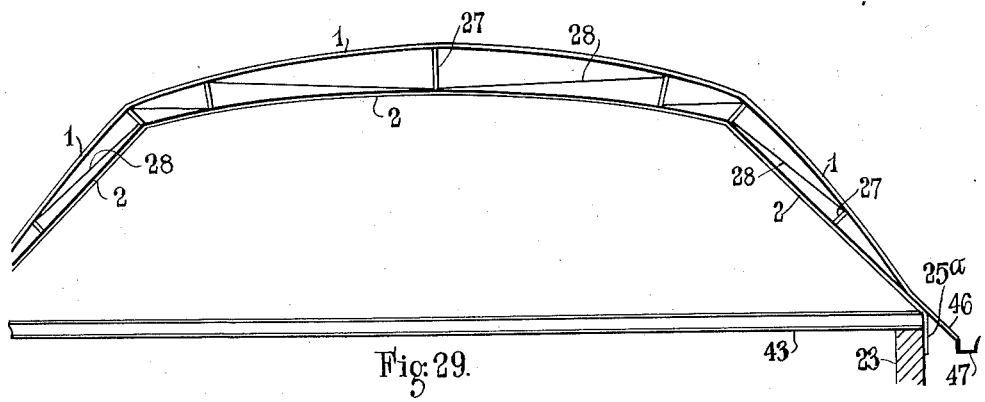
Fig. 29 is an elevation of a roof formed of three sections, the two side sections being in the form of half bowstring girders and the centre portion being provided with the upper and lower sheets curved.

The dovetailed or other corrugated sheets marked 1 and 2 are constructed with the corrugations 3, 4, of the same or varying widths and depths, that is to say, the dovetails or corrugations 3 in sheet 1, whilst arranged at or about the same centres as the dovetails 4 in the opposite sheet 2, may be of the same depth and width as at Figs. 1 and 2. The dovetailed or corrugated sheets 1 and 2 are made of a suitable width and in one or more lengths, or sections or portions according to the length of the span. When the sheets are made in more than one portion in their length, then the ends of the several lengths are arranged to be placed together in the direction of their longitudinal corrugations, the said ends being arranged to pass one within the other for enabling them to be riveted, or bolted, or welded, or otherwise connected together for forming a tubular girder or one continuous length. As, for example, at Figs. 17 to 20 the ends 5 and 6 of a pair of sheets are lapped together and provided with cup shaped depressions or protuberances 7, 8, through which are arranged to pass rivets 9, or bolts 10. Or, if desired, the two sheets may be welded together by forming an opening 11 in the two sheets for the reception of the welding deposit 12, as shown at Fig. 19. When the two sheets are bolted together, then a limpet washer 13 may be provided on the outside of the sheets and a semicircular washer 14 on the inside which enters one of the depressions 7 or 8. In place of the just named types of fixing two sheets together, depressions 15, Figs. 21 and 22, may be formed in the sheets with each of which may or may not be combined one or a number of rivets or bolts arranged in close proximity thereto, whereby the said sheets will be firmly locked together, or the ends 5 and 6 may be butted or lapped together, as shown at Figs. 23 and 24, in which case a reenforcing rod 16 is laid in all, or alternate corrugations, in the two sheets and grouted in position for securely locking the two together.

The two lengths of dovetailed or corrugated sheets 1 and 2 are placed at a suitable space or distance 17 apart, as at Fig. 1, with, say, the flat portions opposite or adjacent to each other. The two sheets 1 and 2 work in harmony, the upper sheet 1 forming the compression member and the lower sheet 2 forming the tensile member. When the inner edges of the dovetailed or corrugated sheets are at a distance apart, so as to leave the space 17 between them, then short lengths of channel, or angle iron or other metal or material 18 are arranged at each of the ends of the sheets (as shown at Figs. 1 and 2), and one or more other pieces of similar material 18 is or are arranged at a suitable distance or distances from each of the said ends. To join corrugated sheets 1 and 2 together, one or both of the ends thereof are turned at or about a right angle in an outward direction to form flanges or lips 20 (Fig. 2) for bolting or riveting, or otherwise securing the said sections or portions together with or without a diaphragm 21 between the flanges 20. The diaphragm 21, when used, is employed for taking up any shear stresses. One of each pair of flanges 20 that are secured together are provided with an extension 22 that is bent at a right angle to, and afterwards, in some cases, in a downward direction 22ª, parallel with the main portion of the flange in such a manner that it will overlap and cover the joint between the said pair of flanges 20 to prevent any concrete or moisture entering the said joint.

The arrangement shown at Fig. 1 forms a slab which is supported as a beam by the walls 23, 23.

At Figs. 3 to 8 a floor or roof is shown constructed of a pair of corrugated sheets 1 and 2 with the upper or lower, or both, of the sheets curved in their length. In all cases the ends 24, 25 are connected together by bolting, riveting or other convenient means. At Fig. 3 where the upper sheet 1 is shown curved in its length, and the lower sheet 2 straight, the two sheets are spaced apart by channel irons 18 which act as distance pieces, the ends of the two sheets being built into the walls 23.

At Figs. 4 to 8 the upper or lower sheets 1 and 2, or both of them, are shown curved, the remaining sheets being straight. As for example, the upper sheet at Fig. 4 is shown curved; at Fig. 5 both sheets are shown curved in opposite directions; at Fig. 6 the lower sheet only is curved; at Fig. 7 the upper sheet is shown partly curved; and at Fig. 8 both of the sheets are shown curved in the same direction. In all of the said views the ends 24, 25 are secured together by bolts or otherwise and built into the walls 23, or are arranged to rest upon the wall or supported by a beam, as at Fig. 4, which may be of the bowstring type. The just named beam is constructed with the upper and lower sheets 1 and 2 straight or curved in their length and of single or double thicknesses, the beam being at a right or other angle in its length to the span of the floor. The floor and beam are connected together by bending the ends 24, 25, of the sheets 1 and 2 of the floor respectively in an upward and downward direction, as at 24$^a$ and 25$^a$; or, the just named portions may be separate from the floor and beam and secured thereto in any convenient manner. Concrete 30 may be placed on the inner and outer surfaces of the sheets forming the beam.

In place of the hereinbefore named channel or angle irons 18 it may be found advisable to use a number of stiffening members 26 formed of angle iron or other metal or wood of any convenient shape which are arranged to pass transversely across the dovetails or corrugations 3 or 4 of the sheeting 1 or 2, and to be spaced apart by vertical metal rods or bars 27 of any convenient shape in cross section. The connecting bars or distance pieces 27 are braced together in any convenient manner by other bars 28 arranged at an angle thereto. The whole of the just named parts form a girder-like structure.

Figure 31:
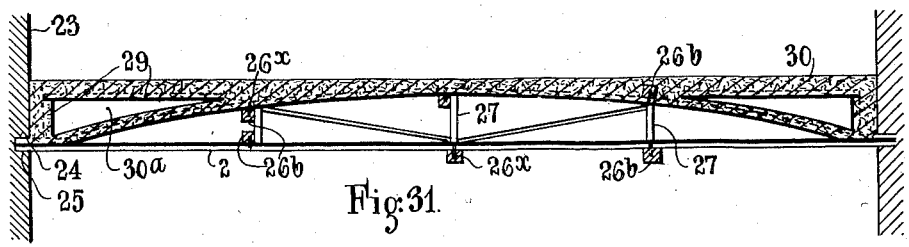
Fig. 31 is a longitudinal section of a floor or roof showing a pair of sheets connected together at their ends and also provided with timber stiffening means, channel and diagonal bars.
Figure 32:
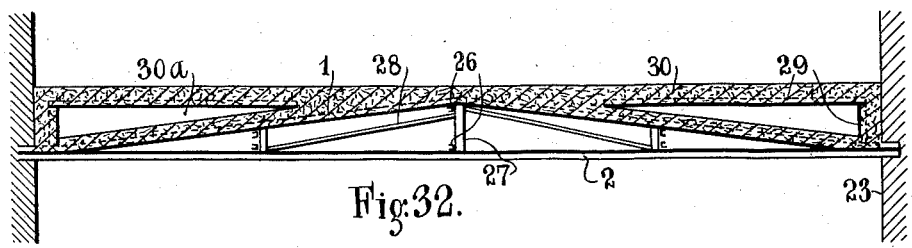
Fig. 32 is a longitudinal section of a floor or roof provided with a pair of sheets adapted to form a triangular shaped centring.
Figure 33:
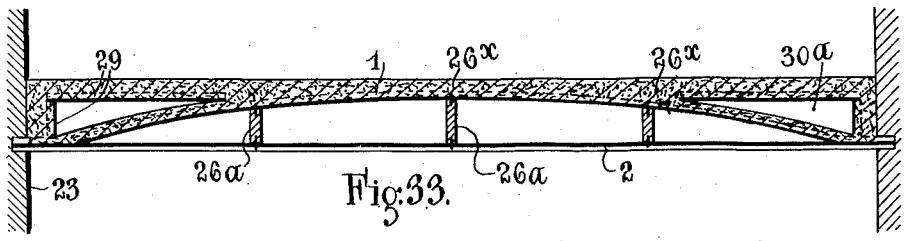
Fig. 33 is a similar arrangement to Fig. 31 but with pieces of timber placed on their edges and spiked to the upper and lower sheets.

When wood is employed as a stiffening means, as shown at Figs. 31, 33, it may be placed between and across the top and bottom sheetings. This can be effected by placing cross pieces or blocks 26$^a$ (Fig. 33) of timber or other material on their edges and securing the same by spikes 26$^x$ to the top and bottom sheets 1 and 2. Another method is to place across the corrugations timber battens 26$^b$ (Fig. 31) on either side of the sheeting and spike them thereto, also if necessary, to secure, by any convenient means, posts 27 of metal or other material to the top and bottom sheetings. The use of the battens 26$^b$ is to stiffen the corrugations between the posts 27, and diagonal bars 28 are placed between the said posts to form a truss. In some cases the ends of the sheeting 1, 2, may have packing pieces between them instead of being closely fixed together. This packing is of any required thickness. The dovetailed or corrugated sheet or sheets 1 and 2 may, when required, be either straight or curved or bent angularly (as shown at Fig. 32), and the two sheets are arranged as just described, to form a bowstring or crescent girder.

The upper dovetails or corrugations 3 may, when required, be filled with concrete 30, and if the concrete is made level on the top, as at Figs. 4 and 5, the haunches may have dovetailed or corrugated sheets 29 arranged therein to form cavities 30$^a$ so as to reduce the weight of the concrete, and at the same time to provide space for laying water, or gas, or other pipes, or electric or other cables and the like.

The dovetails or corrugations 4 in the lower sheets 2 may be filled with concrete or rendering for stiffening or fireproofing purposes, and afterwards be covered with plaster.

When concrete 30 is used, one advantage in forming dovetails 3 in the top sheeting 1 is that the concrete forms more or less homogeneity with the dovetails, so that the compressive strength of the concrete and the steel sheeting can be fully taken into account. To further add to the said homogeneity of the concrete, metal stirrups 31, Fig. 16, in the form of wire are provided and bent, say, for example, as illustrated, so that they enter the dovetails, and if required be clipped thereto.

If additional strength of the sheets 1 and 2 is required bars 40 are placed in the corrugations 3 and 4 and grouted in, as shown at Fig. 10.

When it is desired to construct a floor or roof as at Fig. 7, provided with one or both sheets curved, in sections, then at one or more points in the length of the curve, where the ends 33, 33, of the various sheets are joined or nested together, straight portions 32 are formed opposite the points 34 at which the ends 35, 35, of the various sections of the lower sheet 2 are joined. That is to say, the ends 33 of the sheets are made parallel at the points 32 with the centre line of the structure and the ends 35 to allow the sections to be lifted into position on the building side and the dovetailed ends 33, 35, are slid one within the other, after which they are bolted, riveted or welded together. By making the two sheets 1 and 2 parallel at the points 32, 34, each section or unit can be made complete and then the units nested together so as to form one slab of the required span. Also, it will be readily understood the stiffening members 26, spacing and bracing bars 27, 28, are secured in position before the sections are placed in position.

The two sheets 1 and 2 are fixed together at their ends 24, 25, by bolts, or where this is not sufficient, the said ends of both sheets can be flattened, as at Fig. 11, and the ends 25 of the lower sheet 2 may then be made to extend beyond the upper sheet 1, when it will be bent over the upper one and riveted or bolted thereto. Or, if desired, the two sheets 1 and 2 are laid one on top of the other, as shown at Fig. 25, and a round bar 36, say, of iron or steel, of the required length is secured by wires 37 to another bar 38 of the same length, the distance between them being about the depth of a dovetail, or a greater distance apart and concrete filling completes the joint.

Or, the two bars 36, 38, as shown at Fig. 26, may alternatively be formed from a single strip, or one bar 36 of equivalent length may be bent to form a U, as shown at Fig. 26, and in the cross section at Fig. 27; when in this form the two portions of the bar 36 instead of being wired parallel to each other for the whole of their length may be made to cross each other, as at 39, so that one portion of the said bar is grouted in opposite dovetails.

The combined sheets are placed together with the dovetails of the two respective sheets facing, that is, opposite to each other, as shown at Fig. 27. The wired bar 36 or bars 36, 38, is or are then dropped or put into the double dovetails 3 and 4, and grouted in, as shown in the drawings. All the dovetails may be treated in the same way and will make a strong connection.

In Fig. 9 the two sheets 1 and 2 are bowed or curved to form an arch. If the abutments or walls 23 are not sufficient to take the thrust, then bars 41 are placed to form the tensile tie, and connected to the sheeting by the hereinbefore named rods or bars 27, 28. In some cases a bar or channel girder 42 is placed along the abutments 23, and connected to such ties and the sheeting, so as to spread the horizontal thrust between the tie and the one next thereto.

Figure 30:
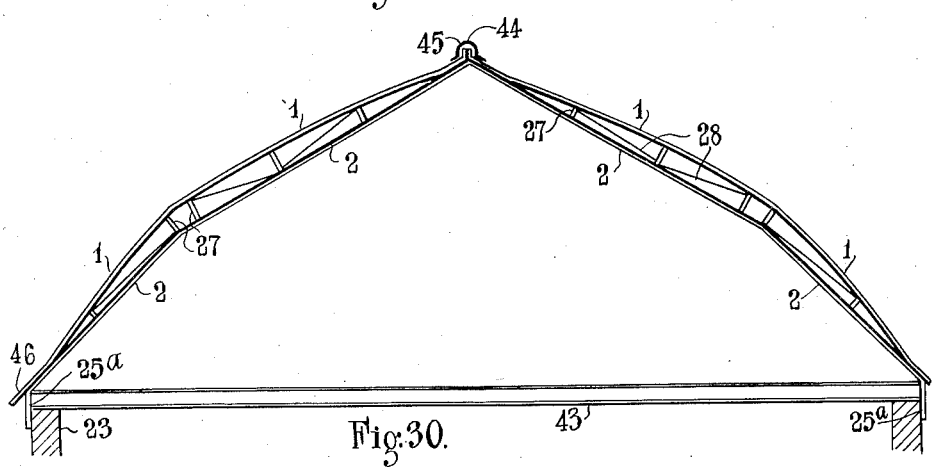
Fig. 30 is an elevation showing a roof formed of four sections all in the form of half bowstring girders, the two centre portions being joined together at the crown of the roof and provided with a cover for the joint.

If desired a pair of dovetailed or other corrugated sheets 1 and 2, of curved, or straight formation, or a comibnation of two of such sheets, connected together as before described may be arranged, when forming a roof, at an angle instead of horizontally. When arranged in this manner, and as shown at Fig. 28, a pair of complete sections, that form the outer slopes of the roof, are secured at their lower ends to the walls 23, or, say, the girders 43 of a building, and the upper ends are secured together at the crown of the roof, or to one or more straight, curved or angular sections, as at Figs. 29 and 30, to form a complete roof span. The sections are connected together by lapping or nesting, as described for Fig. 7, or by providing flanges 44 on one or both of the sheets 1 and 2, as shown at Figs. 28 and 30; the said flanges being bolted, riveted or welded together, and the joint between them covered by a separate or integral cap or cover 45. One of the sheets, say, the upper 1, of the section or sections forming the outer slope or slopes of the roof may be extended at 46 to form, or receive, a rain gutter 47, as at Figs. 28 and 29, and the end of the lower sheet may be bent at an angle for fixing or other purposes, as shown at Figs. 22 to 30 where the end 5 of the lower sheet is shown bent at 25ª for securing the roof to the wall 23.

For hollow walls, as at Figs. 12 and 14, the method of construction is similar to that described for hollow floors and roofs, but plaster or concrete, or both, is placed on the outer sides of the sheeting to form the completed wall.

Walls may be constructed as at Fig. 12 in the form of half a curved girder, that is, a pair of corrugated sheets 1 and 2 are braced together at a suitable distance apart on the ground level 48, the lower ends 49 that enter the ground being splayed and secured by, say, brackets or angle irons 50, to a horizontal corrugated or other sheet 51. When it is desired to embed the splayed ends 49 in concrete 48ª then the horizontal sheet 51 and its brackets 50 are dispensed with and a pair of bracing bars 28 are provided the whole of the said parts being arranged as at Fig. 13. The vertical portions of the dovetailed or other sheets 1 and 2 above the ground or floor 48 that form the wall are curved in their length and secured together at their upper ends 24, 25, and also to, say, the roof or floor of the building by angle irons 52. As shown at Fig. 12 the wall may be constructed in two or more sections and provided with parallel portions at the points 32 and 34 where the sections are lapped or nested together in a similar manner to that described for Fig. 7. At Fig. 14 a wall provided with two straight vertical sheets 1 and 2 spaced apart by channel irons 18 is shown; the lower ends of the sheets 1 and 2 being embedded in the ground 48.

For any of the herein described floors, walls and roofs each of the metal sheets 1 and 2 in which the dovetailed corrugations 3 and 4 are to be formed may be strengthened by combining two or more sheets together so that greater strength is obtained, as shown in Figs. 21 and 22. That is, two or more sheets of metal 1, 1ª, say, iron or steel, or meshing of suitable size, thickness or gauge are laid one on the top of the other for the length of the whole sheets or lap that is required to be strengthened. The dovetailed corrugations 3 or 4, together with, say, depressions or distortions 15, are then formed in the two, or more, sheets 1 and 1ª simultaneously, whereby they are securely locked or secured together as at Figs. 21, 22.

It will readily be understood that the walls and roof of a building may be formed in sections lapped or nested together, as shown at Fig. 15, that is, the top sheet 1 and lower sheet 2 are both bent to form an arch and are connected together with bracing bars 27, 28, and channel bars 18 and 26.

It is to be understood that the invention includes any modifications which may be fairly considered to fall within the scope of the appended claims. Further all the forms of construction hereinbefore described and hereinafter claimed may be used there, or provided wholly or partially with a covering of Portland or other cement, concrete, plaster or the like, or may act as reinforcement to Portland or other cement, concrete or plaster or the like. The term "sheet of metal" is intended to include either plain or perforated sheet metal, or meshed or expanded metal. The term "corrugated" is intended to include any shape of corrugations, such as rounded, square dovetailed or any other desired or advantageous shape.

What I claim and desire to secure by Letters Patent is:—

1. In a building structure, a unit comprising a girder-like assembly consisting of upper and lower chords united at their ends, each of said chords comprising a sheet corrugated lengthwise of the truss, and spacers intermediate the ends of said sheets to form webs, one sheet of said unit acting as a form for plastic material during the process of construction and said unit constituting a permanent part of the completed structure.

2. A structure according to claim 1 in which each of said sheets of said unit is made up of a plurality of contiguous sections, each of said sections having flanged edge portions, the edge flanges of contiguous sections being disposed in abutting relation and rigidly secured together.

3. In a building structure, a unit comprising a girder-like assembly consisting of upper and lower chords united at their ends, each of said chords comprising a sheet corrugated lengthwise of the truss, spacers intermediate the ends of said sheets to form webs, each of said sheets comprising a plurality of contiguous sections having flanged edge portions in abutting relation, a shear plate bridging the space between said sheets and extending between the abutting flanged edge portions of said contiguous sections, and means for securing said abutting flanges and shear plate together, one sheet of said unit acting as a form for plastic material during the process of construction and said unit constituting a permanent part of the completed structure.

4. In a building structure, a structural unit comprising a girder-like assembly consisting of upper and lower chords united at their ends, each of said chords comprising a sheet corrugated lengthwise of the truss, one of said sheets being curved in the direction of its length, spacers intermediate the ends of said sheets, said curved sheet acting as a form for a concrete facing during the process of construction and said unit constituting a permanent support for said facing in the completed structure.

5. In a building, a floor construction unit comprising a girder-like assembly consisting of upper and lower chords united at their ends, each of said chords comprising a sheet corrugated lengthwise of the truss, and spacers between said sheets intermediate the ends thereof, the upper one of said sheets being formed of two sections placed at an angle sloping from the ends upwardly to the center of the truss, said unit acting as a form for a plastic floor forming material during the process of construction and contituting the permanent support therefor in the completed structure.

6. A structure according to claim 1 in which said sheets of said unit are comprised of a plurality of sections longitudinally overlapping and with the corrugations thereof in interlocking relation, the overlapping portions of said sections having cooperating cupped areas securing the section against longitudinal displacement.

7. A structure according to claim 1 in which said sheets of said unit are comprised of a plurality of sections longitudinally overlapping and with the corrugations thereof in interlocking relation, and mechanical means for securing the overlapping portions of said sections against longitudinal displacement.

8. A structure according to claim 1 in which said sheets of said unit are comprised of a plurality of sections longitudinally overlapping and with the corrugations thereof in interlocking relation, the overlapping portions of said sections having cooperating cupped areas, and bolts passing through said cupped areas to secure said sections against longitudinal displacement.

9. A structure according to claim 1 in which said unit is fabricated with the ends of said sheets being in superimposed relation, and a filling of cement in the corrugations of said superimposed ends uniting them to each other.

10. A structure according to claim 1 in which said unit is fabricated with the ends of the lower sheet extending beyond those of the upper sheet and being bent back over the ends of the upper sheet.

11. A structure according to claim 1 in which said unit is fabricated with the ends of said sheets being in superimposed relation, bars positioned in the opposed corrugations at the end portions of both the upper and lower sheets, a plurality of wires interconnecting the bars, and a filling of concrete in the corrugations and embedding the bars and wires to unite said end portions.

12. A structure according to claim 1 in which said unit is fabricated with the ends of said sheets being in superimposed relation, a bent length of bar laid in the opposed corrugations at the end portions of the upper and lower sheets, wires interconnecting the limbs of the bar, and a filling of concrete in the corrugations and embedding said bar and wires to unite said ends.

13. In a building structure, a structural unit for assembly with similar units to form walls, floors and the like, said unit comprising a girder-like assembly of opposed chords each of which consists of a sheet member corrugated lengthwise of the unit and extending continuously from one lateral edge to the other of the unit, struts spacing apart the portions of said sheet chord members between the ends thereof, and diagonal members extending between said chord members and terminating at the opposite ends of adjacent struts, said struts and diagonal members cooperating with said sheet members to form the girder-like assembly, one sheet member of said units acting as a form for plastic material during the process of construction and said units constituting a permanent part of the completed structure.

14. In a building structure, a structural unit for assembly with similar units to form walls, floors and the like, said unit comprising a girder-like assembly of opposed chords each of which consists of a sheet member corrugated lengthwise of the unit and extending continuously from one lateral edge to the other of the unit, struts spacing apart the portions of said sheet chord members between the ends thereof, and transverse members secured to said sheet members adjacent the junction of said struts with said sheet members, one sheet member of said units acting as a form for plastic material during the process of construction and said units constituting a permanent part of the completed structure.

15. A structural unit for assembly with similar units to form floors, walls and the like, said unit comprising a pair of opposed chords consisting of sheet members corrugated lengthwise of the unit, one sheet of said unit being adapted to constitute a form for plastic material during the process of construction and said unit constituting a permanent part of the completed structure, said sheet members extending from one lateral edge of the unit to the other lateral edge, spacers intermediate the ends of said sheets, and a shear member bridging the space between the opposed pairs of lateral edges at one lateral edge of said unit, the edge of said unit at which said shear member is located being adapted to be placed in abutting relation to that edge of a similar unit which is not provided with a shear member.

MARTYN NOEL RIDLEY.